United States Patent

[11] 3,621,933

[72] Inventor Burt F. Raynes
Chula Vista, Calif.
[21] Appl. No. 58,282
[22] Filed July 27, 1970
[45] Patented Nov. 23, 1971
[73] Assignee Rohr Corporation
Chula Vista, Calif.

[54] METHOD AND APPARATUS FOR SUPPRESSING THE NOISE OF AN AIRCRAFT JET ENGINE
22 Claims, 7 Drawing Figs.
[52] U.S. Cl.............................................. 181/33 E,
181/33 HC, 181/33 HD, 239/265.13, 239/265.33
[51] Int. Cl...................................................B64d 33/06,
B64c 9/38, F01n 1/14
[50] Field of Search.......................................... 181/43, 51,
33, 64.1, 33.221, 33.222, 33.05, 33.223;
239/127.3, 265.11, 265.13, 265.17, 265.19,
265.23, 265.33

[56] References Cited
UNITED STATES PATENTS

| | | | |
|---|---|---|---|
| 2,839,891 | 6/1958 | Drakeley...................... | 239/265.33 |
| 3,027,710 | 4/1962 | Maytner....................... | 181/33.221 |
| 3,084,507 | 4/1963 | Kleinhans et al. ............ | 171/33.222 |
| 3,174,282 | 3/1965 | Harrison...................... | 181/33.221 |
| 3,262,264 | 7/1966 | Gardiner et al............... | 239/127.3 |
| 3,495,682 | 2/1970 | Treiber......................... | 181/33.221 |
| 3,516,511 | 6/1970 | Urquhart...................... | 181/33.221 |

FOREIGN PATENTS

| | | | |
|---|---|---|---|
| 1,436,412 | 3/1966 | France ......................... | 181/33.221 |

Primary Examiner—Robert S. Ward, Jr.
Attorney—George E. Pearson

ABSTRACT: An aircraft jet engine is provided with a semicylindrical reflector/suppressor shield which for takeoff of the aircraft is extended sufficiently downstream of the engine nozzle to intercept the accompanying cone of noise of the jetstream several nozzle diameters aft of the nozzle in the region of the expansion boundary of the jetstream where the noise level is maximum so that such noise which otherwise would be radiated toward the ground is reflected by the shield to thus substantially reduce the effective perceived noise level at the ground.
The shield is interrelated structurally and functionally with the engine and nozzle structures so that appropriately configured nozzle and nozzle adjuncts effect stream division, mixing and frequency conversion, ejector action for thrust augmentation at takeoff, and thrust reversal for aircraft braking on landing, all rendered compatible with the operation of the reflector/suppressor shield and the noise abatement provided thereby.

PATENTED NOV 23 1971 3,621,933

INVENTOR.
BURT F. RAYNES
BY
George E. Pearson
ATTORNEY

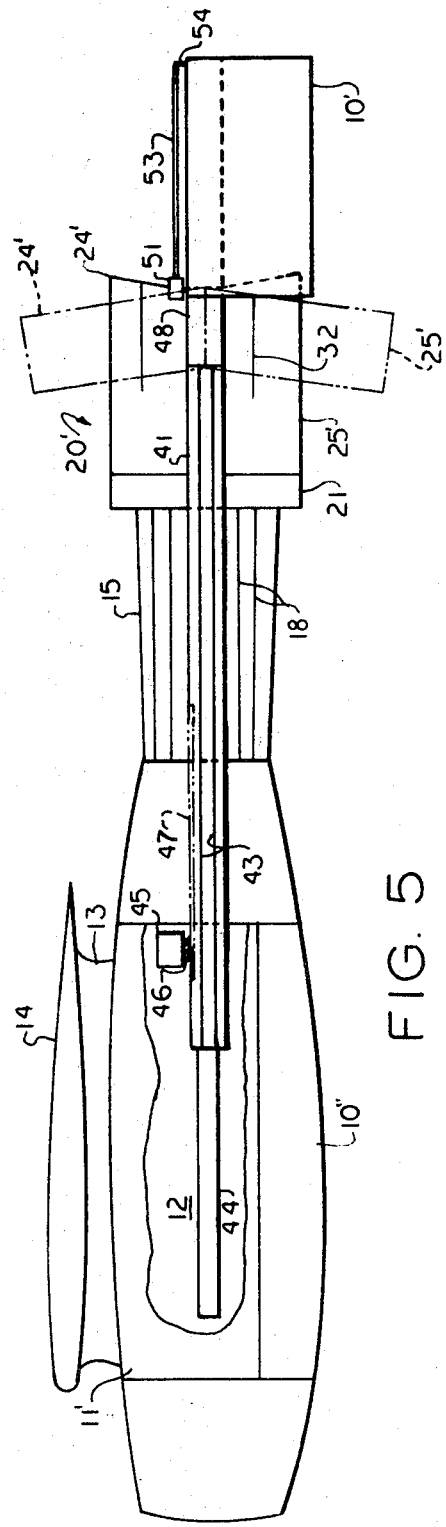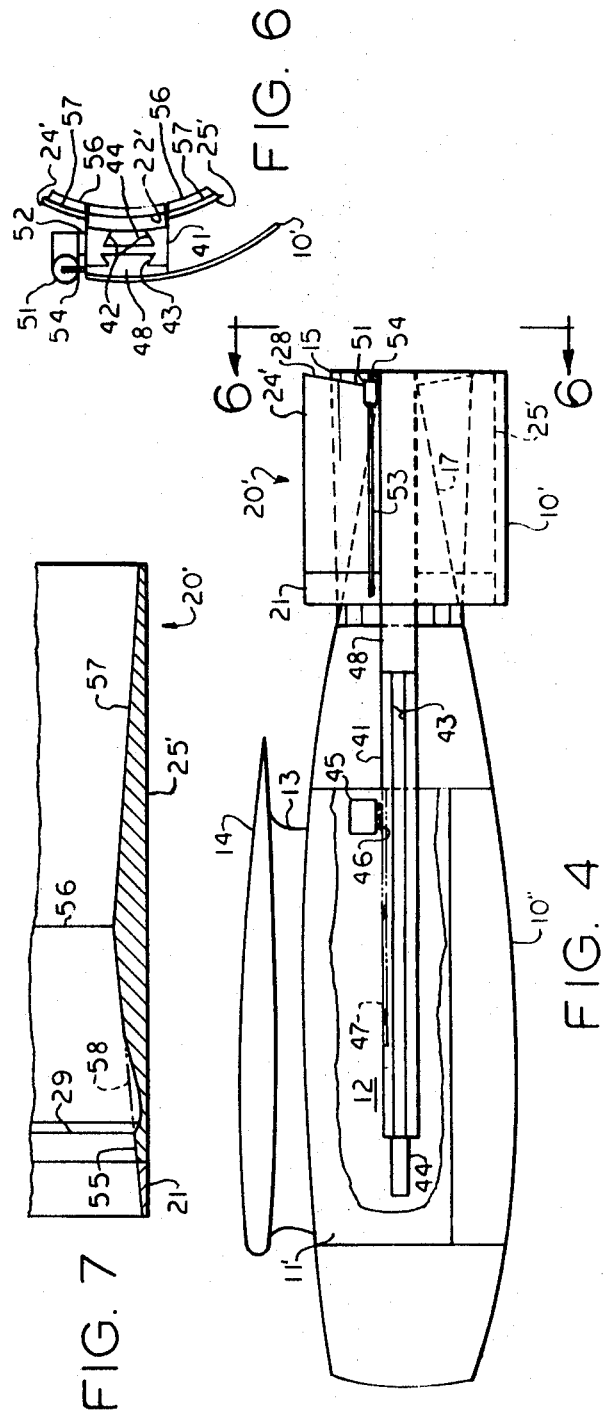

3,621,933

METHOD AND APPARATUS FOR SUPPRESSING THE NOISE OF AN AIRCRAFT JET ENGINE

BACKGROUND OF THE INVENTION

It is known that much of the noise associated with the operation of a jet engine arises from the exhaust jet as the high-velocity, high-temperature gases shear through the surrounding air in the region of the expansion boundary of the jet stream. According to Murray and Gahagan, Great Britain, Pat. No. 553,544, May 1951, the maximum level of the noise accompanying the jet stream arises in a hollow cone of about 80° to 120° included angle surrounding the jet axis, and this noise radiates in all directions transversely of the jet axis.

Murray and Gahagan theorized that the sound waves are refracted at the exit nozzle due to the difference in density between the hot gas and surrounding cool air, and that the sound waves will not be refracted unless there is cold air surrounding the hot gas. Murray and Gahagan accordingly discovered that a sound baffle structure for absorbing and/or reflecting sound waves, when spaced from the exit nozzle of the jet to provide a layer of cool air therebetween, gave rise to such refraction to thus direct the sound waves towards the baffle. They found that the baffle, moreover, when positioned with its leading edge at or slightly rearwardly of the nozzle exit plane and disposed to cut through the hollow cone to intercept the sound waves in the region of maximum noise level, provided the maximum effect in shielding the fuselage accommodation of an aircraft from noise which otherwise would be radiated thereto from the jet stream, the noise level being materially reduced by use of the baffle. The length of the baffle was selected so as to shield that length of the fuselage in which the noise level would otherwise be excessive.

It is known to corrugate the nozzle and/or its surrounding nacelle or cowling and to mix air with the hot gases issuing from the nozzle to augment the thrust as well as to effect sound reduction through cooling, and also be division of the air and gas streams, to raise the frequency of the accompanying noise. The high frequency content of the noise attenuates rapidly, but the low- frequency content, the maximum noise level of which arises several nozzle diameters downstream of the nozzle, radiates to the ground at objectionably high effective perceived noise level thereat.

SUMMARY OF THE INVENTION

The present invention relates to methods and apparatus for suppressing the noise of an aircraft jet engine to substantially reduce the effective perceived noise level produced at the ground during takeoff of the aircraft. This is accomplished by use of a semicylindrical reflector/suppressor shield which is extended into the region of the expansion boundary of the jetstream to intercept the accompanying cone of noise several nozzle diameters aft of the nozzle.

In accordance with one embodiment, the shield is formed as a removable portion of the cowling or nacelle surrounding the engine and its nozzle. In this sense it may serve as an access panel, making an enlarged area of the exposed engine accessible for servicing. During takeoff, the shield is moved out of its stowed position around the engine and translated to its deployed position downstream of the nozzle.

In accordance with another embodiment, the reflector/suppressor is made the terminal extension of a translatable ejector ring or barrel, the combined length of the ejector and reflector in deployed position being effectively that of the reflector/suppressor of the first mentioned embodiment so that in this case, as in the first embodiment, the reflector/suppressor intercepts the cone of noise by several nozzle diameters aft of the nozzle. The ejector thus serves to position the reflector for maximum noise reflection and absorption as well as to inject cooling air for sound suppression and thrust augmentation.

In the case of each embodiment, provision is made for mixing air with the exhaust gases and for dividing the issuing jet streams to effect cooling and frequency conversion and resultant sound suppression of the accompanying noise. In the case of each embodiment, moreover, provision is made for accommodating reverser doors to be deployed during landing to effect braking of the aircraft.

The foregoing and additional features of the present invention will become more clearly apparent from the following detailed description of the best mode thus far devised for practicing the principles of the invention, reference being had to the accompanying drawings wherein:

BRIEF DESCRIPTION OF THE DRAWINGS

FIG. 4 is a view in elevation of an aircraft engine and its suppressor arrangement wherein a translatable ejector-reverser barrel and the reflector/suppressor shield translatably carried thereby are shown in stowed position for inflight operation of the aircraft;

FIG. 5 is a view in elevation of the engine-suppressor arrangement of FIG. 4 showing the ejector-reverser barrel and reflector/suppressor shield in deployed position for takeoff, as shown, or for landing as depicted by the dashed line showing of the reverser doors;

FIG. 6 is a fragmentary end view as seen along the line 6—6 of FIG. 4; and

FIG. 7 is a sectional view of the sidewall of the ejector-reverser barrel shown in FIGS. 4 and 5.

DETAILED DESCRIPTION

Figure 3:
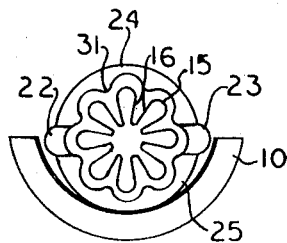
FIG. 3 is an end view of the nozzle and its fairing and of the shield as viewed along the line 3—3 of FIG. 1.
Figure 2:
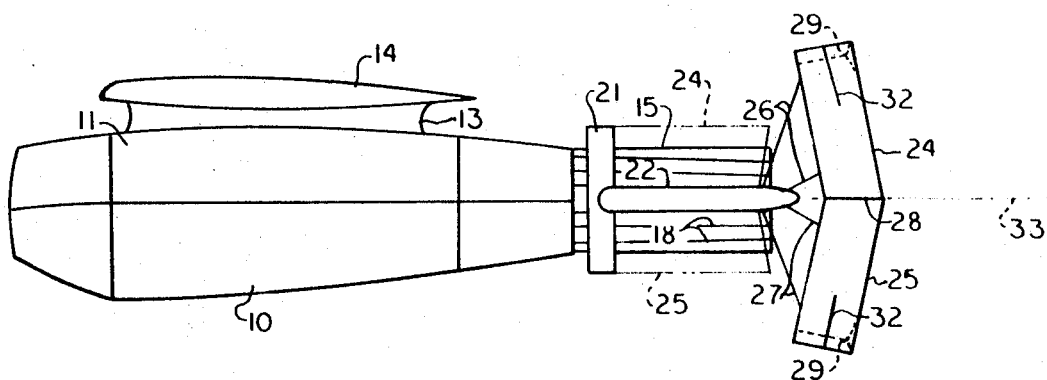
FIG. 2 is a view similar to that of FIG. 1 but showing the reflector/suppressor shield in stowed position and the thrust reverser doors in deployed position for braking of the aircraft on landing.
Figure 1:
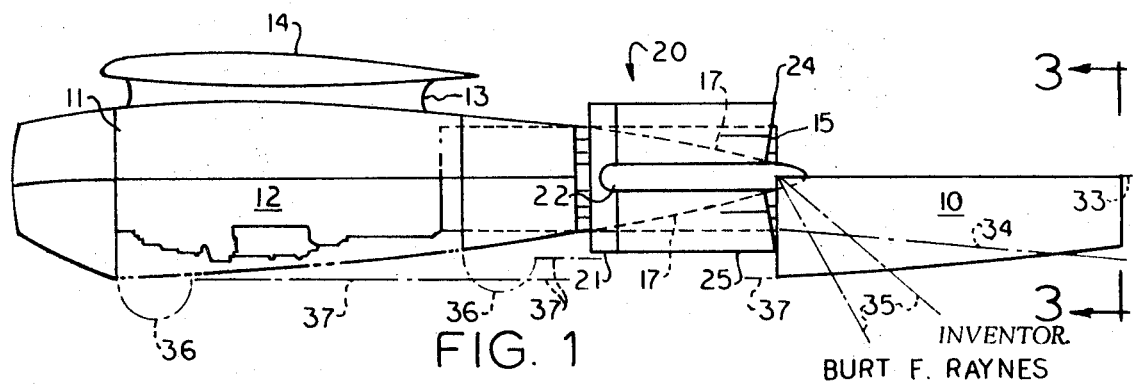
FIG. 1 is a view in elevation of an aircraft jet engine showing its reflector/suppressor shield in deployed position for takeoff of the aircraft.

Referring now to the drawings for a more complete understanding of the invention and first more particularly to FIGS. 1 to 3 thereof there is shown thereon a first embodiment of the invention in which a reflector/suppressor shield 10, which is generally of semicylindrical configuration and tapered somewhat rearwardly, is carved out of and forms a separable part of the cowling 11 for housing or enclosing the fan engine 12. Although a fan engine is disclosed, it will be understood that the principles and features of the invention may be embodied in a so called "primary jet" type engine in which the reflector/suppressor shield would similarly be carved out of the nacelle or other housing surrounding the engine and its nozzle.

In the arrangement disclosed, the engine 12 is shown supported as by the pylon structure 13 from the aircraft wing 14 but, again, the scope of the invention in the application of the principles and features thereof transcends any specific engine design or mounting arrangement therefor. It will be understood, moreover, that whereas for simplicity of disclosure, only one engine is shown, that in practice, an aircraft employing the sound suppressor apparatus herein disclosed and claimed will normally employ a plurality of such engines, each so equipped for sound suppression of the noise accompanying the jet stream issuing from its nozzle.

The end portion of the engine nozzle 15 is corrugated to provide a so-called "daisy" type of configuration 16, FIG. 3, to produce a division of the jet stream which issues from the nozzle, thereby to increase the high frequency content of the noise accompanying the stream. The depth of the corrugations increases from a point upstream of the end of the nozzle, as best depicted by the dashed line 17 in FIG. 1, to the maximum depth at the end of the nozzle as depicted by the daisy configuration in FIG. 3. The corrugations in the nozzle are also depicted by the slid lines 18 in FIG. 2.

The corrugated end portion of nozzle 15 is enclosed by a fairing structure 20 which is combination ejector barrel and thrust reverser, sometimes referred to herein as an ejector-reverser barrel. Fairing 20 comprises a ring 21 which surrounds the nozzle so as to provide a space therebetween for entrainment of slipstream air in a customary ejector action. A pair of stangs 22, 23 extend rearwardly from ring 21 and are suitably supported on the nozzle 15. A pair of thrust reverser doors 24, 25 of substantially semicylindrical shape, when disposed in the stowed position thereof, as shown in FIG. 1, bear at their forward end surfaces against the rear end surface of ring 21 in closing relation therewith, and along their longitudinal edge surfaces, bear against the stangs 22, 23 in closing relation therewith.

As best seen in FIG. 2, the reverser doors are suitably movably mounted on the stangs 22, 23 as by a so-called "4-bar linkage" arrangement of links 26, 27, a set of 4 links being employed, on each side of the nozzle in operative association with the stang mounted on that side. Enclosed within each stang is a bogie mechanism (not shown) for actuating the links to translate the doors between their respective stowed and deployed positions of FIGS. 1 and 2. Such a bogie mechanism suitable for the purpose is disclosed in detail in the copending application of Felix Hom et al. for Jet Reverser Drive System, Ser. No. 681,790, filed Nov. 9, 1967, assigned to the assignee of the instant application, and the disclosure of that case is incorporated herein by reference.

It will be noted that the downstream end surfaces 28 of doors 24, 25 are slanted inwardly and forwardly so that when these surfaces meet as shown in FIG. 2, the doors are slanted forwardly at an angle of about 5°–10°. The doors in this position are thus disposed substantially transversely of the jet axis and effectively block the jetstream in a spoiler action, directing it laterally with only a slight forward vector. The doors, however, have end plate structures depicted by the dashed lines 29 which direct the deflected jetstream forwardly of the engine.

The reverser doors are also corrugated as depicted at 31 in FIG. 3 and by the solid lines 32 in FIG. 2. When the doors are in their stowed position of FIG. 1 wherein the shield 10 is deployed for takeoff, the corrugations in the nozzle and in the surrounding doors promote division of the jet and air streams respectively passed thereby to promote mixing and resultant sound suppression and thrust augmentation during takeoff. In the inflight condition, when the reverser doors have been translated to their stowed position from the deployed position of FIG. 2, the air drawn through the ejector barrel reduces base drag which would otherwise occur in the absence of an aspirating fairing for the corrugated nozzle.

The aforedescribed ejector barrel and reverser door arrangement is generally similar to that disclosed in the copending application of Jack H. Hilbig for Method and Apparatus for Augmenting and Reversing Thrust and Reducing Base Drag and Noise of an Aircraft Jet Engine, Ser. No. 824,414, May 14, 1969, assigned to the assignee of the instant application, and the disclosure of that case is incorporated by reference herein.

It will be seen in FIG. 1 that with the shield 10 removed from housing 11, that a large area of the engine 12 is exposed to thus render the engine easily accessible for servicing. The primary function of the shield, however, in making the same separable from the main housing 11, is to make the shield available for extension downstream of the nozzle to reflect and substantially suppress noise which otherwise would be radiated from the sides of the issuing jet stream and toward the ground during takeoff and thus received, in the absence of the shield, with objectional intensity in the airport and surrounding areas.

The normal divergence of the jet stream in issuing from nozzle 15 is depicted by the dash-dot line 34, this being sometimes referred to as the expansion boundary of the jet stream which, for the nozzle structure disclosed in the instant case, has a divergence angle of the order of 5° relative to the jet axis 33. According to the investigations and theory of Murray and Gahagan, aforementioned, the maximum noise level in the vicinity of an exhaust jet of a gas turbine engine arises in a hollow cone of about 80° to 120° included angle surrounding the jet axis, this included angle being depicted by the dash-dot lines 35 in FIG. 1. According further to the teachings of Murray et al., the baffle shield to have maximum effect must cut through the hollow cone to intercept the sound waves in the region of maximum noise level.

In accordance with more recent theories and actual tests, however, the noise which causes the objectionable effective perceived noise levels at the ground arises from the jet stream several nozzle diameters aft of the exit plane of the nozzle, thus indicating that the cone of noise is more accurately delineated by the expansion boundary line 34. These tests and theories tend to clearly establish, moreover, that for maximum effectiveness of the shield 10, it should extend into the region of the expansion boundary of the jet stream several nozzle diameters aft of the nozzle, as shown, and preferably, at its downstream end portion, to intercept the expansion boundary, as shown, so that a phenomenon known as "attachment" occurs. According to this phenomenon, as tests have proven, when the jet stream moves to engage the shield surface at the end portion of the shield, to thus attach to the shield, the attachment progresses upstream until all of the inner surface of the shield is engaged by the jet stream.

The reflector/suppressor of the instant invention was tested on a 1/8-scale model of a turbofan engine having an extended conical fan nozzle with a primary mixer, and the noise from the nozzle was measured with and without the suppressor shield in place. For purposes of the test, the reflector/suppressor shield consisted of a half shell baffle which was placed around one side of the nozzle. Two lengths of the baffle were used for the tests, the two lengths being equivalent to three and six diameters of the extended fan nozzle under test. Noise data were recorded at five power settings covering the normal operating range of the engine under test, and the noise suppression valves were calculated by plotting the maximum effective perceived noise level on a 200-foot sideline for both tests. The differences in the data derived with and without use of the reflector/suppressor shield at constant energy value provided the measure of effectiveness of the device as a noise suppressor. At a nozzle energy equivalent to takeoff thrust obtainable from the type of engine under test, the 6-nozzle-diameter reflector/suppressor baffle provided 6.2 EPNdb. suppression (6.2 db. reduction in effective perceived noise level) and the 3-nozzle-diameter baffle provided 3.4 EPNdb. suppression.

In the reflector/suppressor arrangement disclosed in FIGS. 1 to 3, the shield 10 has a length equal approximately to 4 times the effective diameter of nozzle 15, that is, a length of 4-nozzle diameters.

The dash-dot lines 36 in FIG. 1 depict the swinging movements of the ends of shield 10 to move the same in and out of the cowling 11, and the dash-dot lines 37 depict the translational movement involved in translating the shield from such intermediate position downstream to the deployed position of the shield, as shown, or upstream to its intermediate position for swinging movement back into the cowling, where it would occupy the position as shown in FIG. 2. The dash-dot lines 36 and 37 also represent schematically the mechanism required for such swinging and translating movements, such mechanism being of any suitable type.

Referring now to FIGS. 4 to 7, there is shown thereon another embodiment of the reflector/suppressor of the instant invention wherein a translatable ejector-reverser barrel 20', is interposed between the nozzle 15 and the reflector/suppressor shield 10' in its deployed position of FIG. 5. Shield 10' for the purposes of this arrangement is approximately half the length of the reflector/suppressor shield 10 of FIGS. 1 to 3. Its downstream end, however, in the deployed position of FIG. 5, is as many nozzle diameters aft of the nozzle exit plane as the downstream end of shield 10 in its deployed position of FIG. 1.

It will be understood that the two embodiments of FIGS. 1 to 3 and FIGS. 4 to 7, respectively, are generally similar and that the same reference characters are employed throughout the several views to designate the same or similar elements of structure.

The ejector-reverser barrel 20', for example, is generally similar aforementioned the ejector-reverser barrel 20 of FIGS. –3. In the case of ejector-reverser barrel 20', the same comprises an upstream ring 21 and rearwardly extending therefrom a pair of diametrically opposed stangs, only one of which is shown in FIG. 6, this being stang 22'. The stangs and ring 21 have interfit therewith the reverser doors 24' and 25' which, in this case are pivotally supported on the stangs which have associated with the doors appropriate links, pivots and bogie drives, all as disclosed in the aforementioned copending application, Ser. No. 681,790, of Hom et al., and the disclosure of that case is incorporated herein by reference thereto.

The stangs respectively are supported by a pair of elongated beams or tracks, one track 41 of which is best disclosed in FIG. 6 in attached relation to stang 22'. Each track has inner and outer channels 42 and 43, respectively, of dovetail cross section, FIG. 6. Inner dovetail channel 42 has slidably received therewithin an appropriately cross sectionally shaped elongated beam or rail 44 which at its forward end is appropriately supported by the engine 12 preferably inside the cowling 11', the diametrically opposite counterpart of rail 44 being similarly supported on the other side of the engine. Also supported on the engine is a suitable drive motor 45 having a drive element such as a gear 46 disposed in operative driving engagement with a gear rack 47 carried by channeled beam 41. Rack 47 is of adequate length so that upon appropriate operation of motor 45, the ejector-reverser barrel 20' is translated along its support rails between the respective stowed and deployed positions of FIGS. 4 and 5, or selectively to any intermediate position therebetween.

Shield 10' has a pair of support rails of which one of the rails 48 best appears in FIG. 6. Rail 48 has a cross-sectional portion which is dovetailed in shape so as to be slidably received in the outer channel 43 of beam 41, its diametrically opposed counterpart rail being similarly received in the channeled beam on the other side of the ejector-reverser barrel 20'. These support rails for shield 10' extend along the longitudinal edge portions of the shield and are secured thereto so that the shield is translatable between its stowed position on barrel 20', as shown in FIG. 4, and its deployed position downstream of the barrel, as shown in FIG. 5, as the support rails are moved slidably along their channeled beams.

A suitable actuator motor 51 is mounted as by the bracket 52 to the channeled beam 41, and its actuator screw 53, or the like, is secured as by the bracket 54 to rail 48 at its trailing end so that the shield 10' is moved between its stowed and deployed positions, or any intermediate position on barrel 20', as desired, upon suitable operation of the actuator motor 51.

With the parts in the full line deployed position of FIG. 5, the aircraft is in the takeoff mode, and the ejector-reverser barrel 20' serves as a highly effective ejector to substantially enhance the thrust of the engine 12 during takeoff. To this end, the contour of the ejector barrel is designed to give optimum ejector performance. Referring to FIG. 7 it will be seen that the leading inner surface 55 of ring 21 and its adjacent reverser door 25' converges at an angle of about 5½° to a throat 56 after which the inner barrel surface 57 diverges at about 4° to the downstream end of the barrel. The stangs also have this convergent-divergent barrel inner wall configuration. Surface 55 is cut away in the region of each of the reverser doors, as depicted by the dashed line 58 of FIG. 7, to form the end plate configuration 29' required for effecting the forward directing of the jetstream when the reverser doors 24' and 25' are moved to their deployed position for effecting thrust reversal, as depicted by the dashed lines in FIG. 5.

The cowling panel 10'' for enclosing the engine 12 and/or the cowling 11' may be removable to make the engine accessible for servicing as in the arrangement of FIGS. 1 to 3.

In the inflight position of the parts, as shown in FIG. 4, the ejector-reverser barrel 20' serves as a fairing about the corrugated nozzle 15 to reduce base drag, as aforedescribed in connection with the embodiment of FIGS. 1 to 3. It will be apparent, moreover, that the reflector/suppressor apparatus of FIGS. 4 to 7, in addition to its operative modes disclosed in FIG. 4 and 5, may by virtue of the translational movements of barrel 20' and shield 10' and the nature of the drives 45 and 51 for these members, that the same may have additional operative modes. Thus for example, the barrel 20' may be extended without extending the shield 10' to thus produce thrust augmentation without the sound suppression afforded by the shield 10'. This arrangement is useful in the case of an abortive landing in which the reverser doors have been deployed but the aircraft cannot be brought to a stop and must takeoff again. In such case, withdrawal of the reverser doors to stowed position on the barrel 20', restores the barrel to its takeoff position. On the other hand, in the case of an abortive takeoff, the barrel 20' and the shield 10' being deployed, the reverser doors may also be deployed to stop the aircraft.

Shield 10', furthermore, may be extended without extending the barrel 20' to thus provide a sound suppressor arrangement similar to that of FIGS. 1 to 3, but with half the length of shield 10. In addition, both the barrel 20' and the shield 10' may be extended variously, that is, their condition of downstream extension may be modulated, either together or separately, to vary the effective combined length of these members as well as the effective lengths of each separately relative to the exit plane of nozzle 15. It will be apparent, moreover, that such modulation of the members 10' and 20' could be accomplished automatically under control of sensors responsive to varying operating conditions, such sensors being appropriately deployed to measure such factors as aircraft speed, thrust, jet velocity, temperature, and divergence angle, and other conditions affecting thrust and noise generation.

Whereas in the foregoing specific embodiments and arrangements of the invention have been disclosed and described, it will be understood that various modifications and different arrangements of the parts may be made without departing from the spirit and scope of the invention.

What is claimed and desired to be secured by Letters Patent of the United States is:

1. The method of suppressing the noise of an aircraft having a jet engine which comprises:

the step preparatory to takeoff of the aircraft of extending a reflector/suppressor shield to a deployed position sufficiently downstream of the engine nozzle to intercept the cone of noise accompanying the jet stream several nozzle diameters aft of the nozzle in the region of the expansion boundary of the jet stream where the noise level is maximum so that such noise which otherwise would be radiated toward the ground is reflected by the reflector/suppressor shield, thereby to reduce substantially the effective perceived noise level at the ground during takeoff, and the step of interposing an ejector barrel between the extended reflector/suppressor shield and the end of the nozzle to provide sound suppression and thrust augmentation by mixing of the ejector-entrained air with the jet stream, and the step after takeoff of withdrawing the reflector/suppressor shield from its deployed position to a stowed position disposed about the nozzle axis and upstream of the end of the nozzle.

2. The method as in claim 1 wherein the reflector/suppressor shield is formed as a separable part of the engine housing and the steps of extending and withdrawing the shield include the steps of translating the shield between said stowed and deployed positions thereof and in and out of the housing.

3. The method as in claim 2 including the step of removing the reflector/suppressor from the engine housing to expose an area of the engine for servicing.

4. The method as in claim 1 wherein the jet engine has thrust reverser doors for braking of the aircraft on landing and the method includes the steps of moving the doors between stowed and deployed positions thereof wherein the doors in the stowed position are arranged about the engine nozzle, and in the deployed position are extended substantially transversely of the nozzle axis and aft of the nozzle effectively to block and reverse the direction of the jetstream issuing from the nozzle.

5. The method of suppressing the noise of an aircraft jet engine having thrust reverser doors for braking of the aircraft on landing in the method comprises:

the step preparatory to takeoff of the aircraft of extending a reflector/suppressor shield to a deployed position sufficiently downstream of the engine nozzle to intercept the cone of noise accompanying the jetstream several nozzle diameters aft of the nozzle in the region of the expansion boundary of the jetstream where the noise level is maximum so that such noise which otherwise would be radiated toward the ground is reflected by the reflector/suppressor shield, thereby to reduce substantially the effective perceived noise level at the ground during takeoff, the step after takeoff of withdrawing the reflector/suppressor shield from its deployed position to a stowed position disposed about the nozzle axis and upstream of the end of the nozzle, the steps of moving the doors between stowed and deployed positions thereof wherein the doors in the stowed position are arranged about the engine nozzle, and in the deployed position are extended substantially transversely of the nozzle axis and aft of the nozzle effectively to block and reverse the direction of the jetstream issuing from the nozzle, said reverser doors in said stowed position thereof forming an ejector barrel about the end portion of the nozzle, and the step of passing ejector-entrained slipstream air for mixing with the jetstream to effect sound suppression and thrust augmentation thereby while said reflector/suppressor is in said deployed position thereof during takeoff of the aircraft.

6. The method as in claim 5 wherein the engine nozzle is corrugated and the method includes the steps of dividing the jetstream issuing from the nozzle and dividing the air stream drawn into the ejector barrel by the dividing action of the corrugated surfaces internally and externally of the nozzle, thereby to promote mixing of the divided jet and air streams in the deployed position of the reflector/suppressor during takeoff, and also thereby to reduce base drag of the corrugated nozzle by reason of the air flow thereover during the inflight operation of the aircraft.

7. The method as in claim 1 and including the steps of translating the ejector barrel between stowed and deployed positions thereof wherein the ejector barrel in the stowed position is disposed around the end portion of the nozzle and in the deployed position is disposed downstream of the nozzle.

8. The method as in claim 7 and including the steps of movably mounting the reflector/suppressor shield on the ejector barrel and translating the same between a stowed position on the ejector barrel and said deployed position extending downstream thereof.

9. The method as in claim 8 and including the steps of movably mounting a pair of thrust reverser doors on the ejector barrel and moving the doors between stowed and deployed positions during the landing of the aircraft.

10. The method as in claim 9 and including the steps of translating the ejector barrel and the reflector/suppressor shield to said deployed positions thereof and moving the reverser doors to said deployed positions thereof.

11. The method as in claim 10 including the steps of mounting the reverser doors as separable portions of the ejector barrel in the stowed position of the doors and extending the doors in deployed position transversely of the jetstream axis and aft of the nozzle so that the jetstream is blocked and reversed thereby.

12. The method as in claim 1 wherein the end portion of the nozzle is corrugated and wherein the method includes dividing the jetstream and entrained air by the corrugated internal and external surfaces of the nozzle to promote said mixing of the jet and air streams, and also to reduce base drag when the ejector barrel is in the stowed position thereof.

13. Apparatus for suppressing the noise of an aircraft having a jet engine, said apparatus comprising, in combination, a translatable reflector/suppressor shield which extends in a deployed position thereof into the region of the expansion boundary of the jetstream issuing from the engine nozzle to intercept the accompanying cone of noise arising several nozzle diameters downstream of the nozzle whereby such noise which otherwise would be radiated toward and reach the ground with objectionable intensity during takeoff of the aircraft is reflected upwardly by the shield thereby to reduce substantially the effective perceived noise level at the ground, and means for translating the shield between said deployed position and a stowed position wherein the shield is disposed about the axis of the nozzle and upstream of said expansion boundary of the jetstream, and an ejector barrel interposed between the extended shield and nozzle and comprising a part of said means for translating said shield between said stowed and deployed positions thereof.

14. Apparatus as in claim 13 wherein the shield is substantially of semicylindrical configuration and forms a separable part of the engine housing in said stowed position of the shield whereby the engine is exposed for servicing when the shield is removed from the housing.

15. Apparatus as in claim 13 and further comprising a pair of thrust reverser doors movably mounted in stowed position about the end portion of the nozzle on diametrically opposite sides thereof, and, when said shield is in the stowed position thereof, being movable to a deployed position in which the doors extend substantially transversely of the nozzle axis and aft of the end of the nozzle so that the jetstream issuing therefrom is blocked and effectively directed forwardly of the engine.

16. Apparatus as in claim 13 wherein said shield is substantially of semicylindrical configuration and substantially of same length as said ejector barrel, said apparatus further comprising means for movably mounting the shield on said ejector barrel for translational movement axially thereof, and means on the ejector barrel for moving said shield translationally of the ejector barrel to said deployed position of the shield.

17. Apparatus as in claim 16 wherein said ejector barrel is translatable from a stowed position surrounding an end portion of the nozzle to said interposed position thereof between the nozzle and shield, and wherein said apparatus further comprises means for translating said ejector barrel between said stowed and interposed positions thereof.

18. Apparatus as in claim 16 wherein said ejector barrel has a pair of thrust reverser doors separably formed therewith and movable in said interposed position of the ejector to a deployed position extending substantially transversely of the jetstream axis and aft of the end of the nozzle so that the jetstream is effectively blocked by the doors in said deployed position thereof and directed forwardly of the engine.

19. Apparatus as in claim 17 wherein said end portion of the nozzle is corrugated to cause division of the issuing jetstream and of the air stream drawn into the ejector barrel when said doors are closed, said ejector barrel when in said stowed position thereof also reducing base drag by the air drawn therethrough and passed over the external surface of the corrugated nozzle.

20. Apparatus as in claim 18, said ejector barrel having inner convergent-divergent surfaces, and the convergent surface portions of said doors having end plate configurations to effect said forward directing of the jetstream.

21. Apparatus for suppressing the noise of an aircraft having a jet engine, said apparatus comprising, in combination, a translatable reflector/suppressor shield which extends in a deployed position thereof into the region of the expansion boundary of the jetstream issuing from the engine nozzle to intercept the accompanying cone of noise arising several nozzle diameters downstream of the nozzle whereby such noise which otherwise would be radiated toward and reach the ground with objectionable intensity during takeoff of the aircraft is reflected upwardly by the shield thereby to reduce substantially the effective perceived noise level at the ground, means for translating the shield between said deployed position and a stowed position wherein the shield is disposed about the axis of the nozzle and upstream of said expansion boundary of the jetstream stream, a pair of thrust reverser doors movably mounted in stowed position about the end portion of the nozzle on diametrically opposite sides thereof and, when said shield is in the stowed position thereof, being movable to a deployed position in which the doors extend substantially transversely of the nozzle axis and aft of the end of the nozzle so that the jet stream issuing therefrom is blocked and effectively directed forwardly of the engine, and said reverser doors in the stowed position thereof forming an ejector barrel around said end portion of the nozzle, thereby to entrain slipstream air for mixing with the jetstream to provide sound suppression and thrust augmentation during takeoff.

22. Apparatus as in claim 17 wherein said end portion of the nozzle is corrugated to divide said jet stream and said entrained air, thereby to promote mixing of said divided jet and air streams during takeoff, and also to reduce base drag of the corrugated nozzle during the inflight operation of the aircraft.

* * * * *